US012581406B2

(12) United States Patent
Kim et al.

(10) Patent No.: US 12,581,406 B2
(45) Date of Patent: Mar. 17, 2026

(54) RF CHANNEL CONTROL DEVICE, BASE STATION DEVICE, AND RF CHANNEL CONTROL METHOD PERFORMED BY SAME

(71) Applicant: SK TELECOM CO., LTD., Seoul (KR)

(72) Inventors: Kang Ho Kim, Seoul (KR); Min Soo Na, Seoul (KR); Gyu Seong Cho, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 303 days.

(21) Appl. No.: 18/238,589

(22) Filed: Aug. 28, 2023

(65) Prior Publication Data
US 2024/0129850 A1     Apr. 18, 2024

(30) Foreign Application Priority Data

Oct. 5, 2022    (KR) ......................... 10-2022-0126973

(51) Int. Cl.
*H04W 52/02*          (2009.01)
(52) U.S. Cl.
CPC .............................. *H04W 52/0206* (2013.01)

(58) Field of Classification Search
CPC .......................... H04W 52/0206; H04W 52/14
See application file for complete search history.

(56) References Cited

U.S. PATENT DOCUMENTS

| 9,143,819 B2 * | 9/2015 | Ramakrishnan ... | H04N 21/4436 |
| 2024/0129850 A1 * | 4/2024 | Kim .................. | H04W 52/0206 |

OTHER PUBLICATIONS

Office Action issued on May 21, 2024 for corresponding Japanese Patent Application No. 2023-121181, along with an English machine translation (7 pages).
"O-RAN Working Group 1 Massive MIMO Use Cases Technical Report", O-Ran Alliance, O-RAN.WG1.MMIMO-Use-Cases-TR-v01.00, Jul. 2022, URL: https://orandownloadsweb.azurewebsites.net/specifications, pp. 91-123, Cited in NPL No. 1.

* cited by examiner

*Primary Examiner* — Gbemileke J Onamuti
(74) *Attorney, Agent, or Firm* — Hauptman Ham, LLP

(57) ABSTRACT

The present disclosure proposes a new technical method for realizing a specific configuration for dynamically/optimally controlling an RF channel in consideration of both throughput of a cell and energy saving in an O-RAN system and realizing an interface operation between O-RAN equipment related thereto, enabling dynamic/optimal control of the RF channel of the cell according to the situation.

16 Claims, 7 Drawing Sheets

FIG. 3

* 3/4 RF Chains Off

* 1/2 RF Chains Off

* 1/4 RF Chains Off

* All RF Chains On

FIG. 4

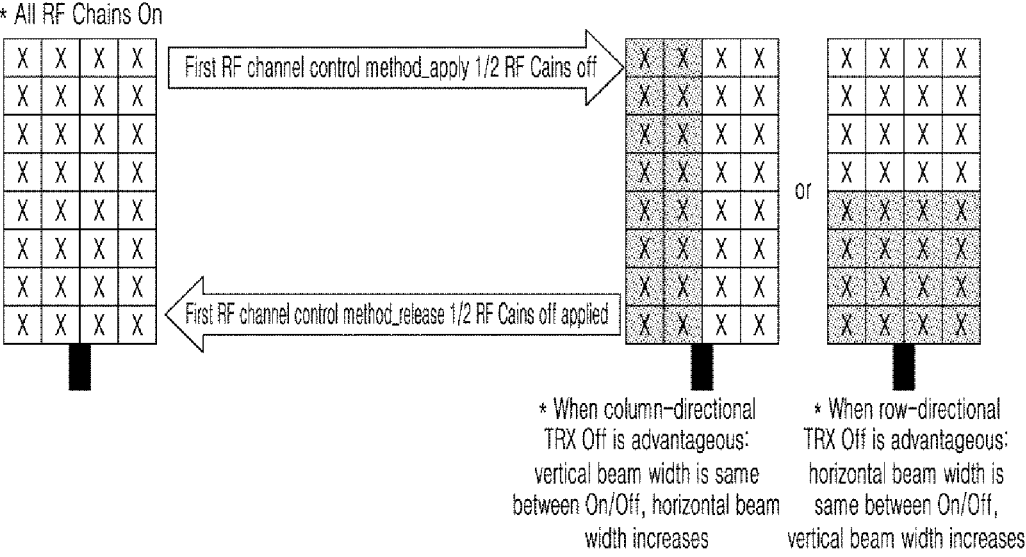

* All RF Chains On

First RF channel control method_apply 1/2 RF Cains off

First RF channel control method_release 1/2 RF Cains off applied or

* When column-directional
TRX Off is advantageous:
vertical beam width is same
between On/Off, horizontal beam
width increases

* When row-directional
TRX Off is advantageous:
horizontal beam width is
same between On/Off,
vertical beam width increases

1

RF CHANNEL CONTROL DEVICE, BASE STATION DEVICE, AND RF CHANNEL CONTROL METHOD PERFORMED BY SAME

CROSS-REFERENCE TO RELATED APPLICATION(S)

This application is based on and claims priority under 35 U.S.C. 119 to Korean Patent Application No. 10-2022-0126973, filed on Oct. 5, 2022, in the Korean Intellectual Property Office, the disclosure of which is herein incorporated by reference in its entirety.

BACKGROUND OF THE INVENTION

1. Field of the Invention

The present signal relates to energy saving technology.

2. Description of the Prior Art

In a mobile network for providing mobile communication services, a radio access network (RAN) supports radio access between a terminal and a network.

Such a RAN accounts for a significant portion of energy consumption in a mobile network, and in particular, a radio unit (RU) consumes the most energy in the RAN.

In order to reduce operating expense (OPEX), communication service operators' interest in reducing power consumption of base stations (particularly RUs) continues to increase, and accordingly, energy saving technology is being introduced.

Meanwhile, 5G required an increase in the communication speed, an increase in fronthaul capacity due to introduction of MEMO, and additional infrastructure such as optical fibers, resulting in an increase in base station installation and operating costs for communication service operators, so open Radio Access Network (O-RAN) technology appeared as a scheme to solve the above problems.

Briefly, the O-RAN technology is a technology for standardizing an interface that connects equipment necessary for implementation of a base station device so to interwork with each other, and a radio unit (RU) (hereinafter referred to as "O-RU") and a distributed unit (DU) (hereinafter referred to as "O-DU") from different manufacturers/vendors are able to operate by interworking with each other on the basis of the O-RAN.

An O-RAN system based on the O-RAN has a structure in which a plurality of equipment developed by different manufacturers/vendors interwork with each other. The plurality of equipment can be a centralized unit (CU) (hereinafter referral to as "O-CU"), an O-DU, an O-RU and intelligent base station control devices (e.g., SMO, RIC, etc.) for controlling base station devices (O-CU/O-DU/O-RU) including the CU, O-DU, and O-RU.

However, since the O-RAN system has a structure in which multi-vendor equipment such as the O-CU, the O-DU, the O-RU, the SMO, the RIC, and the like, which are developed by different manufacturers/vendors, interwork with each other, it is difficult to apply existing energy saving functions that operate on the basis of unique structure and algorithm of each manufacturer thereto.

Accordingly, the present disclosure proposes a specific configuration for dynamically/optimally controlling an RF channel in a multi-vendor base station equipment-based O-RAN system, and an interface operation between O-RAN equipment related thereto.

SUMMARY OF THE INVENTION

The objective to be attained by the present disclosure is to realize a specific configuration for dynamically/optimally controlling an RF channel in a multi-vendor base station equipment-based O-RAN system, and an interface operation between O-RAN equipment related thereto.

An RF channel control device according to an embodiment of the present disclosure may include an information collecting unit configured to collect information about a cell and a controller configured to determine an RF channel control method to be applied to the cell using a specific value identified on the basis of the collected information from among a plurality of RF channel control methods applicable to the cell.

Specifically, the specific value may include at least one of an expected performance degradation value of each method, an expected energy consumption reduction value of each method, which are calculate on the basis of the collected information, and a cell state value determined on the basis of the collected information.

Specifically, the collected information about the cell may include at least one of uplink and downlink radio resource use rates, throughput, the number of concurrently connected UEs, UE location and distribution, mobility, service type information, energy consumption and efficiency, state transition, and state-specific time information of the cell.

Specifically, the controller may calculate an expected performance degradation value and an expected energy consumption reduction value for each of the plurality of RF channel control methods on the basis of the collected information and determine at least one RF channel control method on the basis of the expected energy consumption reduction value from among RF channel control methods in which the calculated expected performance degradation value falls within a predefined range.

Specifically, the controller may determine at least one RF channel control method that satisfies a first condition about whether it is a preconfigured RF channel control method application time period, a second condition about whether the network load is less than or equal to a preconfigured load threshold, a third condition about whether an expected energy consumption reduction value is greater than or equal to a preconfigured saving threshold, a fourth condition about whether an expected performance degradation value is equal to or less than a preconfigured degradation threshold, or a combination thereof and transmit a control command for applying the determined RF channel control method to a radio unit (RU) of the cell such that the RU reconfigures the RF channel according to the control command.

Specifically, the plurality of RF channel control methods may be divided into a method of turning off or on Tx/Rx array of a pattern reflecting the UE location and distribution, among Tx/Rx arrays configured in an RU of the cell, a method of reducing or increasing Tx power in the RU of the cell, and a method of reducing or restoring the number of transmissions of a specific signal (always-on signal) transmitted periodically.

Specifically, the expected performance degradation value for each of the plurality of RF channel control methods may be calculated using performance degradation derived for each of concurrently connected UEs at the UE location on the basis of a performance degradation map obtained by pre-learning performance degradation when each RF channel control method is applied, compared to when the RF channel control method is not applied, for each location in the 3D grid.

Specifically, the controller may determine at least one RF channel control method in which the expected energy consumption reduction value is maximized from among the RF channel control methods, and the expected energy consumption reduction value calculated for the at least one RF channel control method may be calculated using an energy consumption reduction value when the at least one RF channel control method is applied and an energy consumption increase value increased due to the application of the at least one RF channel control method.

Specifically, the energy consumption increase value may be calculated by applying the expected performance degradation value calculated for the at least one RF channel control method to a value obtained by subtracting the energy consumption reduction value when applying the at least one RF channel control method from the energy consumption when the RF channel control method is not applied.

A distributed unit (DU) according to an embodiment of the present disclosure may include a function of transmitting a control command based on collected information about a cell controlled by the DU to a radio unit (RU) of the cell such that the RU reconfigures an RF channel of the cell according to the control command, and the control command may be a command for applying an RF channel control method determined using a specific value identified on the basis of the collected information from among a plurality of RF channel control methods applicable to the cell.

A radio unit (RU) constituting a cell according to an embodiment of the present disclosure may include a function of reconfiguring, when a control command transmitted on the basis of collected information about the cell is received, an RF channel of the cell according to the control command, wherein the control command may be a command for applying an RF channel control method determined using a specific value identified on the basis of the collected information from among a plurality of RF channel control methods applicable to the cell.

An RF channel control method of an RF channel control device according to an embodiment of the present disclosure may include collecting information about a cell and determining an RF channel control method to be applied to the cell using a specific value identified on the basis of the collected information from among a plurality of RF channel control methods applicable to the cell.

Specifically, the specific value may include at least one of an expected performance degradation value and an expected energy consumption reduction value of each method, which are calculate on the basis of the collected information, and a cell state value determined on the basis of the collected information.

Specifically, the determining of an RF channel control method may include calculating an expected performance degradation value and an expected energy consumption reduction value for each of the plurality of RF channel control methods on the basis of the collected information and determining at least one RF channel control method on the basis of the expected energy consumption reduction value from among RF channel control methods in which the calculated expected performance degradation value falls within a predefined range.

Specifically, the determining of an RF channel control method may include determining at least one RF channel control method that satisfies a first condition about whether it is a preconfigured RF channel control method application time period, a second condition about whether the network load is less than or equal to a preconfigured load threshold, a third condition about whether an expected energy consumption reduction value is greater than or equal to a preconfigured saving threshold, a fourth condition about whether an expected performance degradation value is equal to or less than a preconfigured degradation threshold, or a combination thereof, and transmitting a control command for applying the determined RF channel control method to a radio unit (RU) of the cell such that the RU reconfigures the RF channel according to the control command.

Specifically, the expected performance degradation value for each of the plurality of RF channel control methods may be calculated using performance degradation derived for each of concurrently connected UEs at the UE location on the basis of a performance degradation map obtained by pre-learning performance degradation when each RF channel control method is applied, compared to when the RF channel control method is not applied, for each location in the 3D grid.

Specifically, the determining of an RF channel control method may include determining at least one RF channel control method in which an expected energy consumption reduction value is maximized from among the RF channel control methods, and the expected energy consumption reduction value calculated for the at least one RF channel control method may be calculated using an energy consumption reduction value when the at least one RF channel control method is applied and an energy consumption increase value increased due to the application of the at least one RF channel control method.

Specifically, the energy consumption increase value may be calculated by applying the expected performance degradation value calculated for the at least one RF channel control method to a value obtained by subtracting the energy consumption reduction value when applying the at least one RF channel control method from the energy consumption when the RF channel control method is not applied.

An RF channel control method performed in a distributed unit (DU) according to an embodiment of the present disclosure may include transmitting a control command based on collected information about a cell controlled by the DU to a radio unit (RU) of the cell such that the RU reconfigures an RF channel of the cell according to the control command, and the control command may be a command for applying an RF channel control method determined using a specific value identified on the basis of the collected information from among a plurality of RF channel control methods applicable to the cell.

An RF channel control method performed in a radio unit (RU) constituting a cell according to an embodiment of the present disclosure may include reconfiguring, when a control command transmitted on the basis of collected information about the cell is received, an RF channel of the cell according to the control command, and the control command may be a command for applying an RF channel control method determined using a specific value identified on the basis of the collected information from among a plurality of RF channel control methods applicable to the cell.

According to embodiments of the present disclosure, a specific configuration for dynamically/optimally controlling an RF channel in a multi-vendor base station equipment-based O-RAN system may be realized, and an interface operation between O-RAN equipment related thereto may be realized.

Thus, according to the present disclosure, it is possible to have an effect of dynamically/optimally controlling an RF channel of a cell according to the situation by considering that the O-RAN system has a structure in which an intelligent base station control devices (e.g., SMO, RIC, etc.) are introduced.

BRIEF DESCRIPTION OF THE DRAWINGS

The above and other aspects, features, and advantages of the present disclosure will be more apparent from the following detailed description taken in conjunction with the accompanying drawings, in which:

FIGS. 3 to 5 are exemplary diagrams illustrating RF channel control methods applicable to the present disclosure.

DETAILED DESCRIPTION OF THE EXEMPLARY EMBODIMENTS

Hereinafter, various embodiments of the present disclosure will be described with reference to the accompanying drawings.

The present disclosure relates to an open radio access network (RAN) (O-RAN) and energy saving technology.

In a mobile network for providing mobile communication services, a radio access network (RAN) supports radio access between a terminal and a network.

Such a RAN accounts for a significant portion of energy consumption in a mobile network, and in particular, a radio unit (RU) consumes the most in the RAN.

In order to reduce operating expense (OPEX), communication service operators' interest in reducing power consumption of base stations (particularly RUs) continues to increase, and accordingly, energy saving technology is being introduced.

Meanwhile, the advent of 5G required an increase in the wireless speed, an increase in fronthaul capacity due to introduction of MIMO, and additional infrastructure such as optical fibers, resulting in an increase in base station installation and operating costs for communication service operators, so open radio access network (RAN) (O-RAN) technology appeared as a scheme to solve the above problems.

Briefly, the O-RAN is a technology for standardizing an interface that connects equipment necessary for implementation of a base station device so to interwork with each other, and a radio unit (RU) (hereinafter referral to as "O-RU") and a distributed unit (DU) (hereinafter referred to as "O-DU") from different manufacturers/vendors are able to operate by interworking with each other on the basis of the O-RAN.

An O-RAN system based on the O-RAN has a structure in which equipment of intelligent base station control devices (e.g., SMO, RIC, etc.) for controlling respective equipment, that is, a centralized unit (CU) (hereinafter referral to as "O-CU"), an O-DU, and an O-RU, which are developed by different manufacturers/vendors, and base station devices (O-CU/O-DU/O-RU) including the above equipment operate while interworking with each other.

Figure 1:
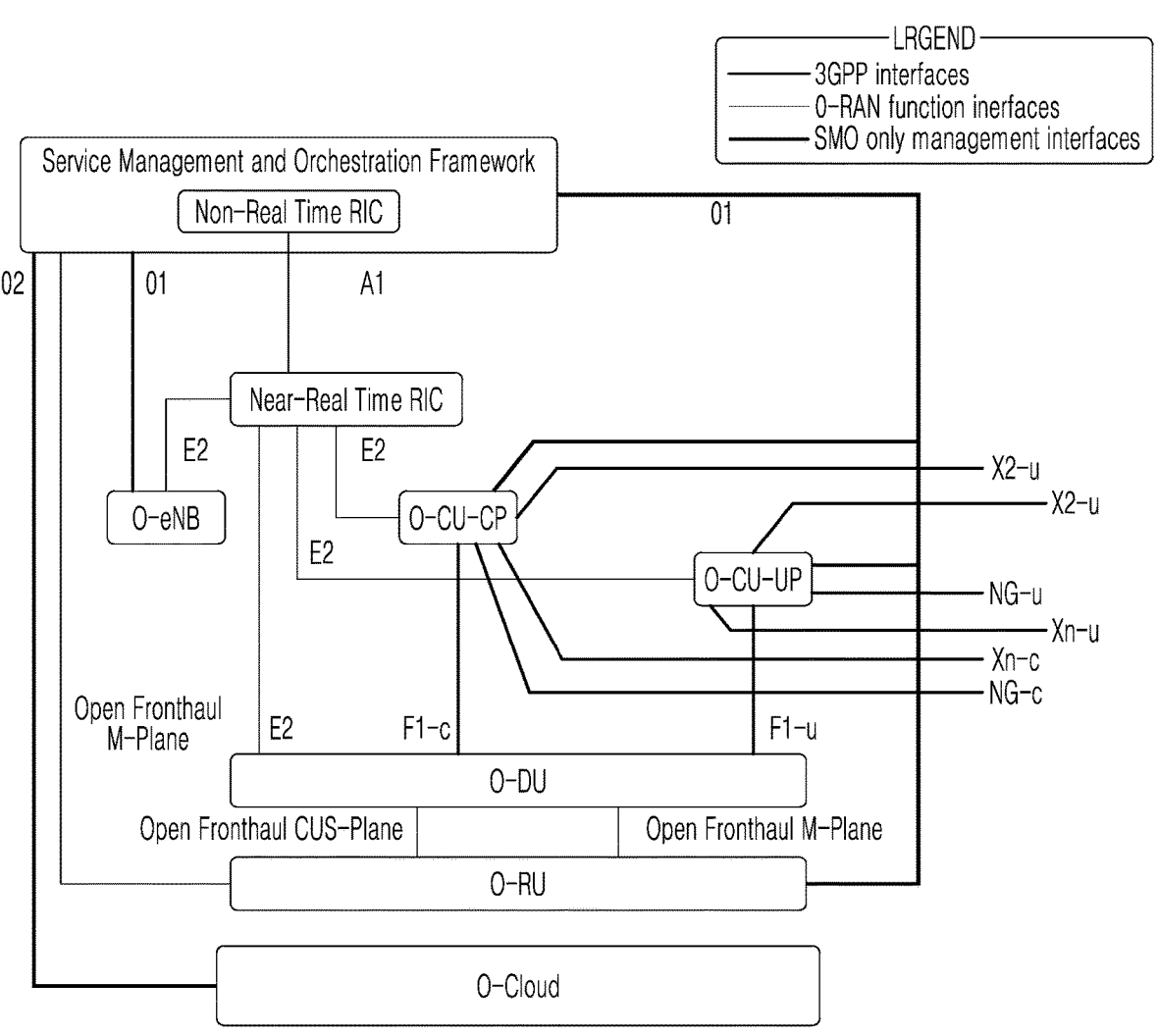
FIG. 1 is an exemplary diagram showing an O-RAN system structure.

FIG. 1 shows the structure of an O-RAN system.

As can be seen in FIG. 1, the O-RAN system is designed to have a structure for implementing an open and intelligent radio access network.

This O-RAN system may be roughly divided into base station devices that are separately implemented as O-CU, O-DU, and O-RU equipment, and intelligent base station control devices (e.g., SMO, RIC, etc.) for controlling base station devices.

Briefly, a service management and orchestration framework (SMO) and a RAN intelligent controller (RIC) may be defined in the intelligent base station control device.

In particular, the RIC corresponding to a controller for an intelligent wireless access network may be divided into a non-real-time RIC (>1 second) layer and a near-real-time RIC (0.01 seconds to 1 second) layer on the basis of control latency.

The non-real-time RIC layer performs analyzing big data such as RAN policy management, network traffic patterns, terminal mobility patterns, service types, and quality-of-service (QoS) prediction patterns, and artificial intelligence-based management through machine learning.

Policies (e.g., application conditions described below, performance degradation map based on machine learning models, etc.) produced in this non-real-time RIC are distributed to near-real-time RICs through an A1 interface.

An O-RAN system based on the non-real-time RIC may be an O-RAN system based on a non-real-time intelligent base station control device.

The near-real-time RIC layer provides near real-time radio resource management. The near-real-time RIC layer serves functions such as service quality and device mobility management, as well as load balancing in unit of terminals and resource block management.

The near-real-time RIC layer may transmit control commands (e.g., handover, resource allocation, etc.) to the O-CU and the O-DU through an E2 interface, collects measured data, and provide data to non-real-time RICs through the A1 interface. Control algorithms related to load balancing and mobility management are optimized through this interaction.

An O-RAN system introduced with the near-real-time RIC may be an O-RAN system based on a near real-time intelligent base station control device.

The O-CU is divided into a control plane (O-CU-CP) that delivers control information and a user plane (O-CU-UP) that delivers traffic, and executes control commands received from the non-real-time RIC or near-real-time RIC. The O-CU supports F1/W1/E1/X2/Xn interfaces defined in the 3GPP standard.

The O-DU serves radio link control, real-time Layer 2 (L2) functions in the medium access control layer, and processing of baseband signals.

The O-RU performs radio signal processing.

An open fronthaul interface is defined between the O-DU and the O-RU.

As such, as shown in FIG. 1, the O-RAN system has a structure in which equipment, such as the O-CU, the O-DU, the O-RU, the SMO, the RIC, and the like, developed by different manufacturers/vendors operate by interworking with each other.

However, since the O-RAN system has a structure in which multi-vendor equipment such as the O-CU, the O-DU, the O-RU, the SMO, the RIC, and the like, which are developed by different manufacturers/vendors, operates while interworking with each other, it is difficult to apply existing energy saving functions that operate on the basis of unique structure and algorithm of each manufacturer thereto.

Accordingly, various studies and attempts are being made to introduce an energy saving function in the O-RAN system.

For example, RF channel control is performed in a manner in which an operator fixedly applies a single control method configured to conform to conditions in the existing energy saving technology, so it is impossible to dynamically select and apply an optimal method suitable for the situation.

Meanwhile, since an intelligent base station control device is introduced in the O-RAN structure, it may be realized to select/apply an optimal RF channel control method suitable for the situation.

Therefore, the present disclosure proposes a specific configuration for dynamically/optimally controlling an RF channel in consideration of both throughput of a cell and energy saving in a multi-vendor base station equipment-based O-RAN system, and an interface operation between O-RAN equipment related thereto.

Specifically, the present disclosure is intended to realize a specific configuration capable of dynamically/optimally controlling an RF channel of a cell according to the situation by considering that the O-RAN system has a structure in which intelligent base station control devices (e.g., SMO, RIC, etc.) are introduced, and propose a specific technology for realizing an interface operation between O-RAN equipment related thereto.

Figure 2:
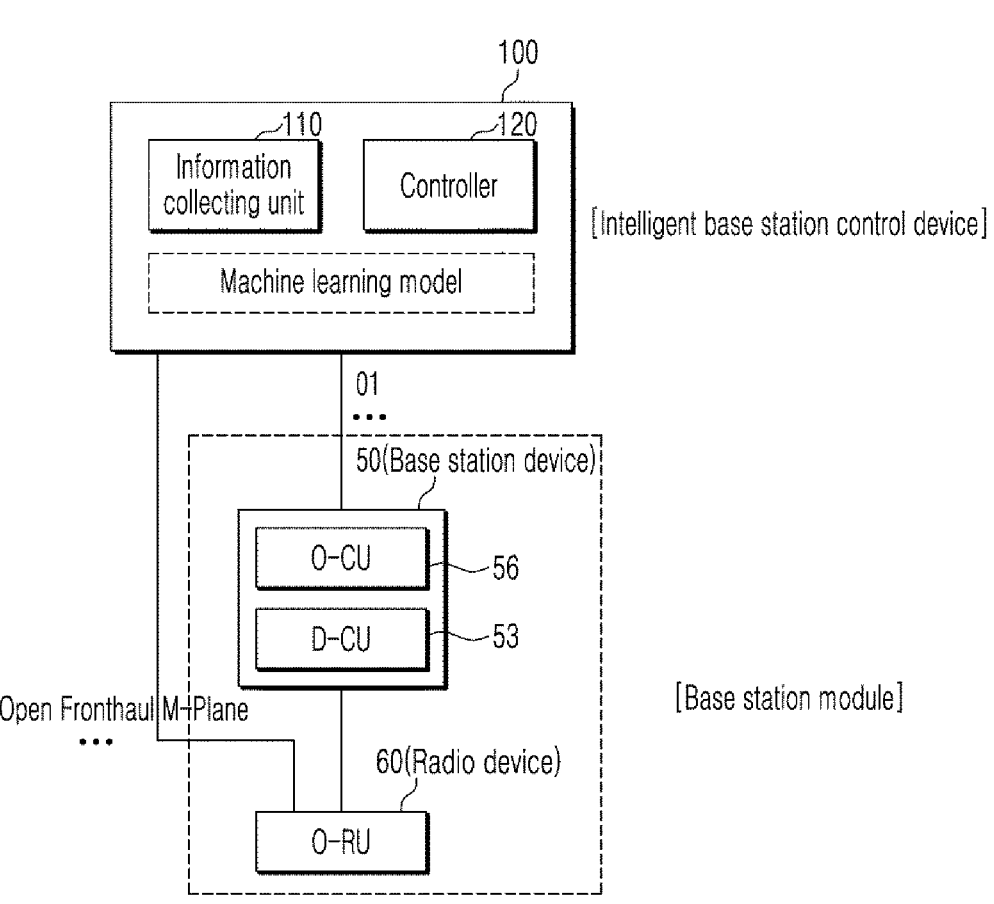
FIG. 2 is a block diagram showing configurations of an RF channel control device, a distributed unit (DU), and a radio unit (RU) according to an embodiment of the present disclosure.

FIG. 2 shows devices for implementing a specific technology, that is, an RF channel control method, proposed in the present disclosure, such as an RF channel control device 100, and a distributed unit (DU) and a radio unit (RU) constituting a base station device 70.

Prior to a detailed description, the RF channel control device 100 of the present disclosure may be implemented in intelligent base station control devices (e.g., SMO, non-real-time RIC, near-real-time RIC, etc.).

However, FIG. 2 illustrates the structure of a non-real-time intelligent base station control device-based O-RAN system and the case where the RF channel control device 100 of the present disclosure is implemented in intelligent base station control devices (e.g., SMO and non-real-time RIC) for the convenience of description.

In addition, although one base station device 70 of the present disclosure under the control of the RF channel control device 100 is shown in FIG. 2, this is only for the convenience of description and illustration, and a plurality of base station devices 70 may be provided.

Although one radio device 60 connected to a base station module 50 in the base station device 70 is shown, this is also for the convenience of description and illustration, and a plurality of O-RUs 60 may be provided.

However, for the convenience of description, a detailed description will be made below with reference to the configuration shown in FIG. 2.

First, the detailed configuration of the RF channel control device 100 of the present disclosure will be described with reference to FIG. 2.

As shown in FIG. 2, the RF channel control device 100 according to an embodiment of the present disclosure may include an information collecting unit 110 and a controller 120.

All or at least some of the configuration of the RF channel control device 100 may be implemented in the form of a hardware module or software module, or may be implemented in a combination of a hardware module and a software module.

Here, the software module may be understood as, for example, an instruction executed by a processor that controls operation in the RF channel control device 100, and the instruction may be stored in a memory of the RF channel control device 100.

As a result, the RF channel control device 100 according to an embodiment of the present disclosure realizes specific technology proposed by the present disclosure, that is, an RF channel control method, through the above-described configurations, and respective configurations of the RF channel control device 100 will be described in more detail below.

The information collecting unit 110 serves to collect information about a cell.

At this time, the information about the cell collected by the information collecting unit 110 may be collected from an O-RAN-supported centralized unit (CU) (O-CU) or distributed unit (O-DU) through a management information (O1 interface) defined between service management and orchestration (SMO) and elements of the O-RAN.

The base station device 70 to which the present disclosure is applied may be divided into a base station module 50 and a radio device 60.

In the case where the present disclosure relates to an O-RAN system, the base station module 50 may be an O-RAN-supported CU (O-CU) 56 and an O-RAN-supported DU (O-DU) 53, and the radio device 60 may correspond to an O-RAN-supported radio unit (RU) (O-RU) 60.

Describing a specific embodiment, each base station device 70 (particularly, the O-CU 56 or the O-DU 53) under the control of the RF channel control device 100 may transmit, to the RF channel control device 100, information about the cell of each O-RU 60 connected thereto.

The information transmitted to the RF channel control device 100 above may include uplink and downlink radio resource use rates, throughput, the number of concurrently connected UEs, UE location and distribution, mobility, service type information, and the like of the cell of the O-RU 60.

Furthermore, the information transmitted to the RF channel control device 100 may further include energy consumption and efficiency, state transition, state-specific time information, and the like of the O-RU 60.

Here, energy consumption and efficiency, state transition, and state-specific time information are information produced by the O-RU 60, and may be transmitted to the O-DU 53→the O-CU 56→the RF channel control device 100 or to the O-DU 53→the RF channel control device 100, thereby being used as collection information about the cell of the O-RU 60.

In addition, each base station device 70 (particularly, the O-CU 56 or the O-DU 53) may transmit the information (e.g., uplink/downlink radio resource use rates, throughput, the number of concurrently connected UEs, UE location and distribution, mobility, service type information, energy consumption and efficiency, state transition, state-specific time information, and the like of the O-RU 60) about the cell produced as described above to the RF channel control device 100 periodically or constantly at the time of production.

Accordingly, in the present disclosure, the O-RAN Cell control device 100 (information collecting unit 110) may collect information about the cell of the O-RU 60 from each base station device 70 (particularly, the O-CU 56 or the O-DU 53) under the control.

At this time, the information about the cell may be collected from each base station device 70 (particularly, the O-CU 56 or the O-DU 53) through the O1 interface defined between the SMO and the elements of the O-RAN.

As described above, an operation in which the RF channel control device 100 implemented in the intelligent base station control device collects information about the cell from each base station device (O-CU or O-DU) by utilizing the O1 interface is defined in the present disclosure.

The controller 120 may serve to determine an RF channel control method to be applied to the cell of the O-RU 60 from among a plurality of RF channel control methods applicable to the cell of the O-RU 60 using a specific value identified on the basis of the collected information.

Here, the specific value may include at least one of an expected performance degradation value and an expected energy consumption reduction value of each method, which are calculated on the basis of the collected information, and a cell state value determined on the basis of the collected information.

Describing an embodiment, the controller 120 may calculate an expected performance degradation value and an expected energy consumption reduction value for each of a plurality of RF channel control methods on the basis of the previously collected information about the cell of the O-RU 60.

Then, the controller 120 may select RF channel control methods in which the previously calculated expected performance degradation value falls within a predefined allowable range from among a plurality of RF channel control methods and determine at least one RF channel control method from among the selected RF channel control methods on the basis of the expected energy consumption reduction value.

In addition, to describe an embodiment, the controller 120, based on the previously collected information about the cell of the O-RU 60, may determine at least one RF channel control method satisfying preconfigured application conditions as the RF channel control method to be applied to the cell of the O-RU 60, from among a plurality of RF channel control methods.

At this time, the application conditions may include a first condition about whether it is a preconfigured RF channel control method application time period, a second condition about whether the network load is less than or equal to a preconfigured load threshold, a third condition about whether an expected energy consumption reduction value is greater than or equal to a preconfigured saving threshold, a fourth condition about whether an expected performance degradation value is equal to or less than a preconfigured degradation threshold, or a combination thereof.

For example, an embodiment will be described below on the assumption of an application condition configured as a combination of the third and fourth conditions.

The controller 120 may calculate an expected performance degradation value and an expected energy consumption reduction value for each of a plurality of RF channel control methods on the basis of the previously collected information about the cell of the O-RU 60.

Accordingly, the controller 120 may select RF channel control methods in which the previously calculated expected performance degradation values are less than or equal to a degradation threshold according to the fourth condition (fall within a predefined allowable range) from among a plurality of RF channel control methods.

Then, the controller 120 may determine, from among the selected RF channel control methods, at least one RF channel control method (single or a combination of two or more) in which the previously calculated expected energy consumption reduction value is greater than or equal to a saving threshold according to the third condition and maximized as the optimal RF channel control method to be applied to the cell of the O-RU 60.

An embodiment on the assumption of an application condition configured as a combination of the first to fourth conditions will be described as follows.

If it is the time period of applying RF channel control methods according to the first and second conditions, and if the network load identified through real-time monitoring is less than or equal to a load threshold, the controller 120 may select at least one RF channel control method (single or a combination of two or more) according to the third and fourth conditions from among a plurality of RF channel control methods as described above and determine the same as the optimal RF channel control method.

Here, in the present disclosure, various methods may be defined as a plurality of RF channel control methods applicable to the cell of the O-RU 60.

For example, as a plurality of RF channel control methods, a first method of turning off or on some Tx/Rx arrays of a pattern reflecting the UE location and distribution, among Tx/Rx arrays configured in the O-RU of the cell, a second method of reducing or increasing Tx power in the O-RU of the cell, and a third method of reducing or restoring the number of transmissions of a specific signal (always-on signal) transmitted periodically.

Hereinafter, the aforementioned RF channel control methods will be described in detail with reference to FIGS. 3 to 5.

Figure 3:
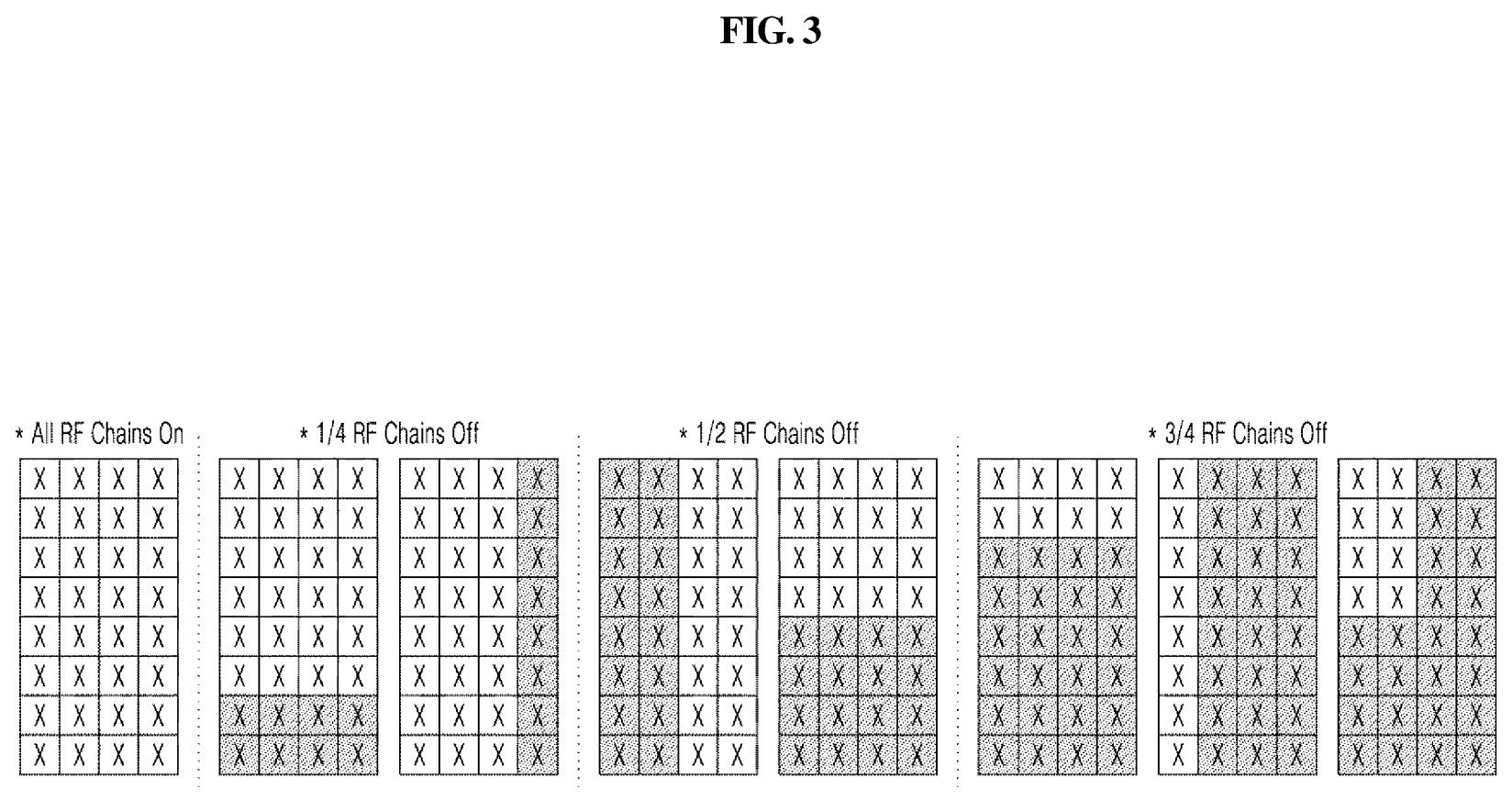

FIG. 3 shows a first method of turning off or on some Tx/Rx arrays.

This first method is a method for controlling the RF channel configuration in a manner of turning off ¼ RF chains, ½ RF chains, or ¾ RF chains of all RF chains (Tx/Rx arrays) of the O-RU 60 serving the cell of the O-RU 60, or turning back on the RF chains turned off.

The first method may reduce power consumption to the extent of the RF chains that are turned off, and coverage types such as a beam width and the number of layers in the vertical/horizontal direction may vary depending on the patterns of RF chains (Tx/Rx arrays) that are turned off.

Therefore, the first method must reflect UE location and distribution when selecting the pattern of some RF chains (Tx/Rx arrays) to be turned off.

Specifically, as the number of Tx/Rx arrays increases in the horizontal or vertical direction, the beam width becomes narrower and sharper in that direction so that the number of allocatable orthogonal beams may increase, thereby improving single user (SU) and multiple user (MU) performance.

Accordingly, in the case of determining and applying the first method of turning off ½ RF chains, if the UEs are mostly distributed in the vertical direction, a pattern (the left pattern on the right) of reducing the number of columns of Tx/Rx arrays may be determined, and if the UEs are mostly distributed in the horizontal direction, a pattern (the right pattern on the right) of reducing the number of rows of Tx/Rx arrays may be determined by reflecting the UE location and distribution in the coverage, and then applied.

Figure 5:
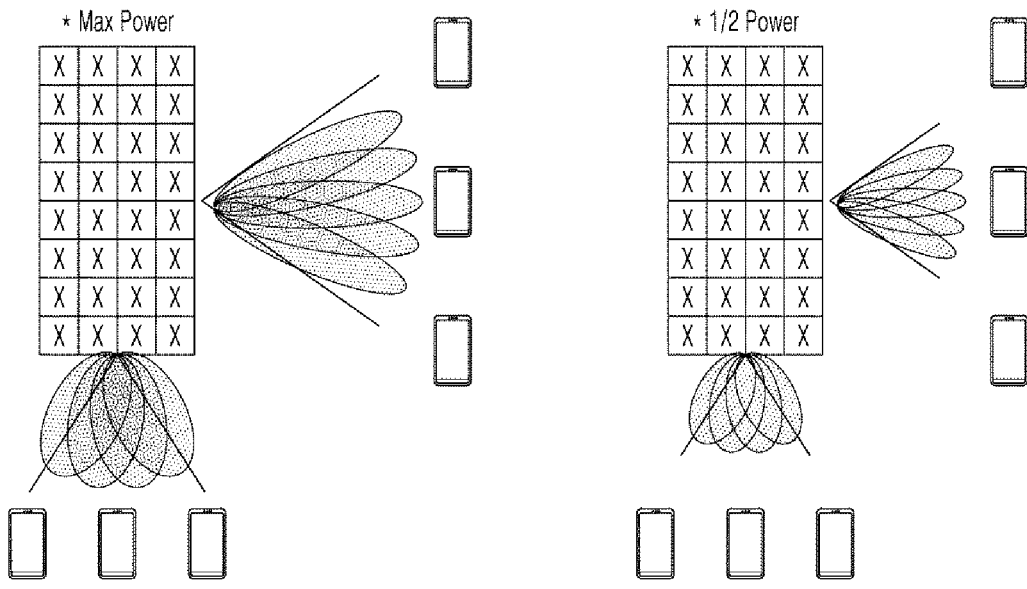

Meanwhile, FIG. 5 shows a second method of reducing or increasing Tx power.

The second method is a method for controlling the RF channel configuration in a manner of reducing the TX power to ½ or ¼ in all RF chains (Tx arrays) serving the cell of the O-RU 60 or of increasing the reduced TX power back to the maximum.

Since only the TX power is reduced so that the size of the coverage becomes smaller while the shape of the coverage such as the beam width, the number of beams/layers, or the like remains, the second method may be determined and applied when the UEs are evenly distributed around the center area of the cell.

Meanwhile, the third method is a method of controlling the RF channel configuration in a manner of reducing or restoring the number of transmissions of a specific signal (always-on signal) that is periodically transmitted.

For example, assuming a synchronization signal block (SSB) as a specific signal (always-on signal), the third method may control the RF channel configuration in a manner of increasing the SSB transmission period to reduce the number of SSB transmissions, reducing the number of SSBs transmitted every period to reduce the number of SSB transmissions, or restoring the increased SSB transmission period or the reduced number of SSBs to restoring the number of SSB transmissions.

The third method described above has the advantage of maintaining coverage and data transmission performance without change even though the extent of reducing power consumption is small, compared to the first and second methods.

As described above, the controller 120, based on the collected information about the cell of the O-RU 60, may calculate an expected performance degradation value and an expected energy consumption reduction value for each of a plurality of RF channel control methods (e.g., first, second, and third RF channel control methods).

Then, the controller 120 may determine an optimal channel control method (single or a combination of two or more) depending on the above-described application conditions using the expected performance degradation value and the expected energy consumption reduction value of each RF channel control method (e.g., the first, second, or third method).

Hereinafter, a configuration for determining an optimal RF channel control method (single or a combination of two or more) in the present disclosure will be described in detail.

First, the controller 120, based on a performance degradation map obtained by pre-learning performance degradation when each RF channel control method is applied, compared to when the RF channel control method is not applied, for each location in the 3D grid, may calculate an expected performance degradation value for each of a plurality of RF channel control methods using the performance degradation derived for each of UEs that are concurrently connected at the UE location.

Specifically, in the present disclosure, performance degradation when each RF channel control method (e.g., the first, second, or third method) is applied, compared to when the RF channel control method is not applied, may be pre-learned for each location in the 3D grid through a predefined machine learning model, thereby producing/constructing a performance degradation map as a pre-learning result.

Such a pre-learned performance degradation map may be expressed as a table shown in Table 1 below.

TABLE 1

| X | Y | Z | Expected Performance Degradation |
|---|---|---|---|
| 0 | 0 | 0 | 0 |
| 0 | 0 | 1 | -1% |

12

TABLE 1-continued

| X | Y | Z | Expected Performance Degradation |
|---|---|---|---|
| 0 | 0 | 2 | -4% |
| ... | ... | ... | ... |
| 0 | 1 | 0 | -2% |
| 0 | 1 | 1 | -5% |
| 0 | 1 | 2 | -4% |
| ... | ... | ... | ... |
| 1 | 0 | 0 | -10% |
| 1 | 0 | 1 | -8% |
| 1 | 0 | 2 | -12% |
| ... | ... | ... | ... |

Accordingly, based on the performance degradation map pre-learned for each location in the 3D grid, the controller 120 may calculate an expected performance degradation value for each of a plurality of RF channel control methods using the performance degradation derived for each concurrently connected UE at the UE location according to Equation 1 below.

[Equation 1]

$$\text{Expected Performance Degradation}_{Total\,throughput} = 1 - \frac{\sum_{i=0}^{Max\,UE\,Index}\left(\begin{array}{c} UE_i's\ \text{Throughput} \times \\ \text{Performance Degradation} \\ \text{at } UE_i's\ \text{Position} \times \\ \text{Weight}_{Service\,Type} \end{array}\right)}{\left(\sum_{i=0}^{Max\,UE\,index} UE_i's\ \text{Throughput}\right)}$$

Here, Weight$_{Service\ Type}$ is a performance degradation weight applied depending on a service type, and may range from 0 to 1. For example, a value of 1 may be applied to a Data call, and 0.7 may be applied to VoNR, thereby reflecting the performance degradation caused by VoNR with a greater weight.

In addition, Performance Degradation at UE$_1$'s Position indicates performance degradation when applying an RF channel control method to be applied, which is obtained by applying the current location of each UE to the performance degradation map obtained by pre-learning performance degradation for each location in the 3D grid when each RF channel control method (e.g., the first, second, or third method) is applied.

That is, the controller 120, based on the performance degradation map obtained by pre-learning performance degradation for each location in the 3D grid when each RF channel control method (e.g., the first, second, or third method) is applied, may calculate an expected performance degradation value (Expected Performance Degradation$_{Total\ throughput}$) when applying the RF channel control method to be applied, which is derived for each of the concurrently connected UEs at the UE location, according to the above-described Equation 1 using the performance degradation (Performance Degradation at UE$_1$'s Position) when applying the RF channel control method to be applied.

Alternatively, the controller 120, based on the performance degradation map obtained by pre-learning for each location in the 3D grid, may calculate an expected performance degradation value for each of a plurality of RF control methods using the performance degradation derived for each of the concurrently connected UEs at the UE location according to Equation 2 below.

[Equation 2]

$$\text{Expected Performance } DegradationAverage_{degradation} = \frac{\sum_{i=0}^{Max\ UE\ index}\left(\begin{array}{c}\text{Performance Degradation}\\ \text{at } UE_i's \text{ Position} \times\\ \text{Weight}_{Service\ Type}\end{array}\right)}{\text{Number of } UEs}$$

That is, the controller 120, based on the performance degradation map obtained by pre-learning performance degradation for each location in the 3D grid when each RF channel control method (e.g., the first, second, or third method) is applied, may calculate an expected performance degradation value (Expected Performance DegradationAverage$_{degradation}$) when applying the RF channel control method to be applied, which is derived for each of the concurrently connected UEs at the UE location, according to Equation 2 using the performance degradation (Performance Degradation at UE$_1$'s Position) when applying the RF channel control method to be applied.

Here, "Expected Performance Degradation$_{Total\ throughput}$" is a value primarily based on the performance degradation in terms of cell capacity, and "Expected Performance DegradationAverage$_{degradation}$" is a value primarily based on the average performance degradation of UEs, and one of Equations 1 and 2 may be selected and utilized depending on policies.

For example, assuming that the predefined allowable range is 20% in performance degradation, the controller 120, based on collected information, may calculate expected performance degradation values when applying a plurality of RF channel control methods (e.g., the first, second, and third methods) according to Equation 1 or 2, and as a result of the calculation, if the first, second, and third RF channel control methods correspond to 10%, 25%, and 5%, respectively, the first and third RF channel control methods may be selected.

Then, the controller 120 may determine an optimal RF channel control method (single or a combination of two or more) from among the selected first and third RF channel control methods on the basis of an expected energy consumption reduction value calculated according to Equation 3.

Expected Energy Consumption Reduction = [Equation 3]

Energy Consumption Reduction$_{TX/RX\ Off}$ +

Energy Consumption Reduction$_{Power\ Reduction}$ +

Energy Consumption Reduction$_{Always\ on\ signal\ reduction}$ −

Energy Consumption Increase$_{Performance\ degradation}$

Here, Energy Consumption Reduction$_{TX/RX\ off}$ indicates an energy consumption reduction value when the first method is applied, Energy Consumption Reduct-ion$_{Power\ reduction}$ indicates an energy consumption reduction value when the second method is applied, and Energy Consumption Reduction$_{Always\ on\ signal\ reduction}$ indicates an energy consumption reduction value when the third method is applied.

In addition, Energy Consumption In-crease$_{Performance\ degradation}$ indicates an energy consumption increase due to the application of the RF channel control method to be applied.

In the present disclosure, application of the RF channel control method causes performance (throughput) degradation of the UEs, which leads to an increase in PRB usage and an increase in power consumption of devices to which the RF channel control method is not applied, so the expected energy consumption reduction value (Expected Energy Consumption Reduction) needs to reflect Energy Consumption Increase$_{Performance\ degradation}$.

This energy consumption increase value (Energy Consumption Increase$_{Performance\ degradation}$) may be calculated by applying the expected performance degradation value (Expected Performance Degradation$_{Total\ throughput}$) calculated for the RF channel control method to be applied to the value obtained by subtracting the energy consumption reduction value when applying the RF channel control method to be applied from the energy consumption when not applying (before applying) the RF channel control method.

That is, the controller 120 may calculate an energy consumption increase value (Energy Consumption Increase$_{performance\ degradation}$) according to Equation 4 below.

Energy Consumption Increase$_{performance\ degradation}$= [Equation 4]
(Energy Consumption before applying RF Channel Control−Energy Consumption Reduc-tion$_{TX/RX\ Off}$−Energy Consumption Reduction-Power$_{Reduction}$−Energy Consumption Reduct-ion$_{Always\ on\ signal\ reduction}$)×Expected Perfor-mance Degradation$_{Total\ throughput}$ Accordingly, assuming that the first and third RF channel control methods in which the expected performance degradation value is calculated 20% or less, which falls within the allowable range, are selected as described above, the controller 120 may calculate expected energy consumption reduction values as shown in Equation 5 below for the first RF channel control method, the third RF channel control method, and a combination of the first and third methods according to Equation 3.

Expected Energy Consumption Reduction of first method=Energy Consumption Reduct-ion$_{TX/RX\ Off}$+0+0−Energy Consumption Increase$_{performance\ degradation}$ calculated by first method Expected Energy Consumption Reduction of third method=0+0+Energy Consumption Reduct-ion$_{Always\ on\ signal\ reduction}$−Energy Consumption Increase$_{performance\ degradation}$ calculated by third method Expected Energy Consumption Reduction of combination of first and third methods= Energy Consumption Reduction$_{TX/RX\ Off}$+0+ Energy Consumption Reduct-ion$_{Always\ on\ signal\ reduction}$−(Energy Consumption Increase$_{performance\ degradation}$ calculated by first method+Energy Consumption Increase$_{performance\ degradation}$ calculated by third method) [Equation 5]

In addition, the controller 120, based on the expected energy consumption reduction values calculated for the first RF channel control method, the third RF channel control method, and the combination of the first and third methods, may determine at least one RF channel control method (the first method, the third method, or a combination of the first and third methods) in which the expected energy consumption reduction value is maximized as an optimal RF channel control method.

As described above, when the optimal RF channel control method (single or a combination of two or more) to be applied to the cell of the O-RU 60 is determined, the controller 120 may transmit a control command for applying the determined RF channel control method to the O-RU 60 of the corresponding cell, so that the O-RU 60 may reconfigure the RF channel according to the control command.

For example, the controller 120 may transmit the above-described control command to the O-DU 53 connected to the O-RU 60 through an O1 interface defined between the SMO and the elements of the O-RAN.

Alternatively, the controller 120 may transmit the above-described control command to the O-CU 56 that controls the O-DU 53 connected to the O-RU 60 through the O1 interface such that the control command is transmitted to the O-DU 53 by the O-CU 56.

Accordingly, the base station module 50 (O-CU 56/O-DU 53) receiving the control command through the O1 interface may transmit the control command to the radio device 60 (the O-RU 60) of the corresponding cell in a manner of controlling the O-RU 60 according to the received control command, so that the O-RU 60 may reconfigure the RF channel according to the control command.

At this time, control according to the control command may be performed/delivered through an interface defined in an open radio access network (RAN) (O-RAN) fronthaul (hereinafter referral to as "open fronthaul M-plane").

Meanwhile, the controller 120 may transmit the afore-mentioned control command to the O-RU 60 through the open fronthaul M-plane so that the O-RU 60 may reconfigure the RF channel according to the received control command.

As described above, in the present disclosure, an operation in which the RF channel control device 100 implemented in the intelligent base station control device transmits, to the O-RU of each base station device (particularly the O-CU/O-DU), a control command for applying an RF channel control method to the cell by utilizing an O1 interface or open fronthaul M-plane may be defined.

Hereinafter, a detailed configuration of the base station device 70 in the present disclosure will be described with reference to FIG. 2.

As shown in FIG. 2, the base station device 70 according to an embodiment of the present disclosure may include a base station module 50 and a radio device 10 (RU or O-RU) of the present disclosure.

In addition, the base station module 50 may include the distributed unit 53 (DU or O-DU) of the present disclosure.

All or at least some of the configurations of the base station device 70 may be implemented in the form of a hardware module or a software module, or may be implemented in a combination of a hardware module and a software module.

Here, the software module may be understood as, for example, an instruction executed by a processor that controls operation in the base station device 70, and the instruction may be stored in a memory of the base station device 70.

As a result, the base station device 70 according to an embodiment of the present disclosure realizes specific technology proposed by the present disclosure, that is, an RF channel control method, through the above-described configurations, and respective configurations of the base station device 70 will be described in more detail below.

Prior to a description, as the present disclosure relates to the O-RAN system, the base station module 50 may be an O-RAN-supported CU, i.e., an O-CU 56 and an O-RAN-supported DU, i.e., an O-DU 53, and the radio device 60 may correspond to an O-RAN-supported RU, i.e., an O-RU 60.

The base station module 50 (the O-DU 53 or the O-CU 56) may transmit information about the cell of each O-RU 60 under its control to the RF channel control device 100.

Furthermore, the O-RU 60 of the present disclosure may produce information including at least one of energy consumption and efficiency, state transition, and time for each state of the same (RU) so as to be used as collected information about the cell of the O-RU 60.

That is, the O-RU 60 may produce its (O-RU's) own energy consumption and efficiency, state transition, and state-specific time information, and transmit the same to the O-DU 53→the O-CU 56→the RF channel control device 100 or to the O-DU 53→the RF channel control device 100 so as to be used as collected information about the cell of the O-RU 60.

More specifically, in the present disclosure, a message format for transmitting energy consumption and efficiency, state transition, and state-specific time information of the O-RU may be defined.

For example, an energy consumption/efficiency request message transmitted from the RF channel control device 100/O-DU 53 to the O-RU 60 may be defined as follows.

```
performance-measurement-objects
    ...
    energy-measurement-objects
        measurement-object      -- [power, voltage, current, performance_ratio]*// Report Select report target indicator (multiple selections possible)
        operation               -- [1: activate, 0: deactivate] // Inform of whether to initiate/stop measurement and notification
        energy-measurement-interval [0 - 65535s]        // Define measurement period corresponding to unit statistic value in O-RU
        energy-notification-interval [0 - 65535s]        // Define measurement value notification cycle in O-RU
        report-information      -- [min, max, average, deviation] // Define output value type for target indicator (multiple selections possible)
    ...
```

Here, power indicates power consumption, Voltage indicates voltage, Current indicates current, and performance_ratio indicates the operation ratio of an object to be measured, compared to the full specification.

In addition, an energy consumption/efficiency report message transmitted from the O-RU 60→the O-DU 53/RF channel control device 100 may be defined as follows.

```
measurement-result-stats
    ...
    energy-stats                 // measurement-interval > If measurement-interval > notification-interval, configured as collection of several
                                 measurement-results
        from          --         [ start time of first measurement]
        to            --         [end time of last measurement ]
        energy-measurement-result // detailed results of first measurement
            from             -- [start time of target measurement]
            to               -- [end time of target measurement ]
                measurement-object       -- [power, voltage, current, performance_ratio] // first indicator result (ex, power)
                        min              -- [8 bytes floating number] // report-information included if it is included in report-information, if not included,
                                         omitted
                        max              -- [8 bytes floating number] // report information included if it is included in report-information, if not included,
                                         omitted
                        average          -- [8 bytes floating number] / report-information included if it is included in report-information, if not included,
                                         omitted
                        deviation    -- [8 bytes floating number] // report-information included if it is included in report-information, if not included,
                                         omitted
                measurement-object       -- [power, voltage, current, performance_ratio]// second indicator result (ex, current)
                        ...
        energy-measurement-result //detailed results of second measurement
            ...
        // Expand in list form up to last measurement result
```

The O-RU 60 of the present disclosure, upon receiving a control command transmitted based on collected information about its own cell, may perform a function of reconfiguring the RF channel of the cell according to the control command.

Specifically, as described above, the base station module 50 (O-CU 56/O-DU 53) receiving a control command through the O1 interface from the RF channel control device 100 of the present disclosure may transmit the control command to the O-RU 60 in a manner of controlling the radio device 60 (O-RU 60) of the cell according to the received control command.

Accordingly, the O-RU 60 of the present disclosure may reconfigure the RF channel for the cell according to the received control command.

At this time, control according to the control command may be performed through an interface defined in the open radio access network (RAN) (O-RAN) fronthaul.

As can be seen from FIG. 1, in the O-RAN fronthaul between the O-CU 56/O-DU 53 and the O-RU 60 in the O-RAN system, open fronthaul M-plane, as well as open fronthaul CUS-plane (open fronthaul C-plane, U-plane, or S-plane), is defined.

Briefly, the open fronthaul C-plane provides an interface for transmitting control information such as scheduling information, beamforming information, and the like, the open fronthaul U-plane provides an interface for data transmission, and the open fronthaul S-plane provides an interface for transmitting timing and synchronization information.

In the present disclosure, in addition to the aforementioned open fronthaul CUS-plane, the open fronthaul M-plane defined as an interface for remote O-RU initialization, configuration, management, and like is intended to be utilized.

Alternatively, the O-RU 60 of the present disclosure may receive a control command from the RF channel control device 100 of the present disclosure through the open fronthaul M-plane as described above.

Accordingly, the O-RU 60 of the present disclosure may reconfigure the RF channel for the cell according to the received control command.

As described above, in the present disclosure, an operation in which the RF channel control device 100 implemented in the intelligent base station control device transmits, to the O-RU of each base station device (particularly the O-CU/O-DU), a control command for applying an RF channel control method to the cell by utilizing the O1 interface or open fronthaul M-plane may be defined.

As can be seen from the above description, according to the present disclosure, a specific configuration for dynamically/optimally controlling an RF channel in a multi-vendor base station equipment-based O-RAN system in consideration both of throughput of a cell and of energy saving may be realized, and an interface operation between O-RAN equipment related thereto may be realized.

Thus, according to the present disclosure, it is possible to have an effect of dynamically/optimally controlling an RF channel of a cell according to the situation by considering that the O-RAN system has a structure in which intelligent base station control devices (e.g., SMO, RIC, etc.) are introduced.

Meanwhile, the embodiments in which the RF channel control device 100 of the present disclosure is implemented in intelligent base station control devices (e.g., SMO and non-real-time RIC) in the O-RAN system structure based on the non-real-time intelligent base station control device have been described above.

However, the present disclosure may also be applied to an O-RAN system structure based on the near-real-time intelligent base station control device, and in this case, the RF channel control device 100 of the present disclosure may be implemented in intelligent base station control devices (e.g., SMO and near-real-time RIC).

Figure 6:
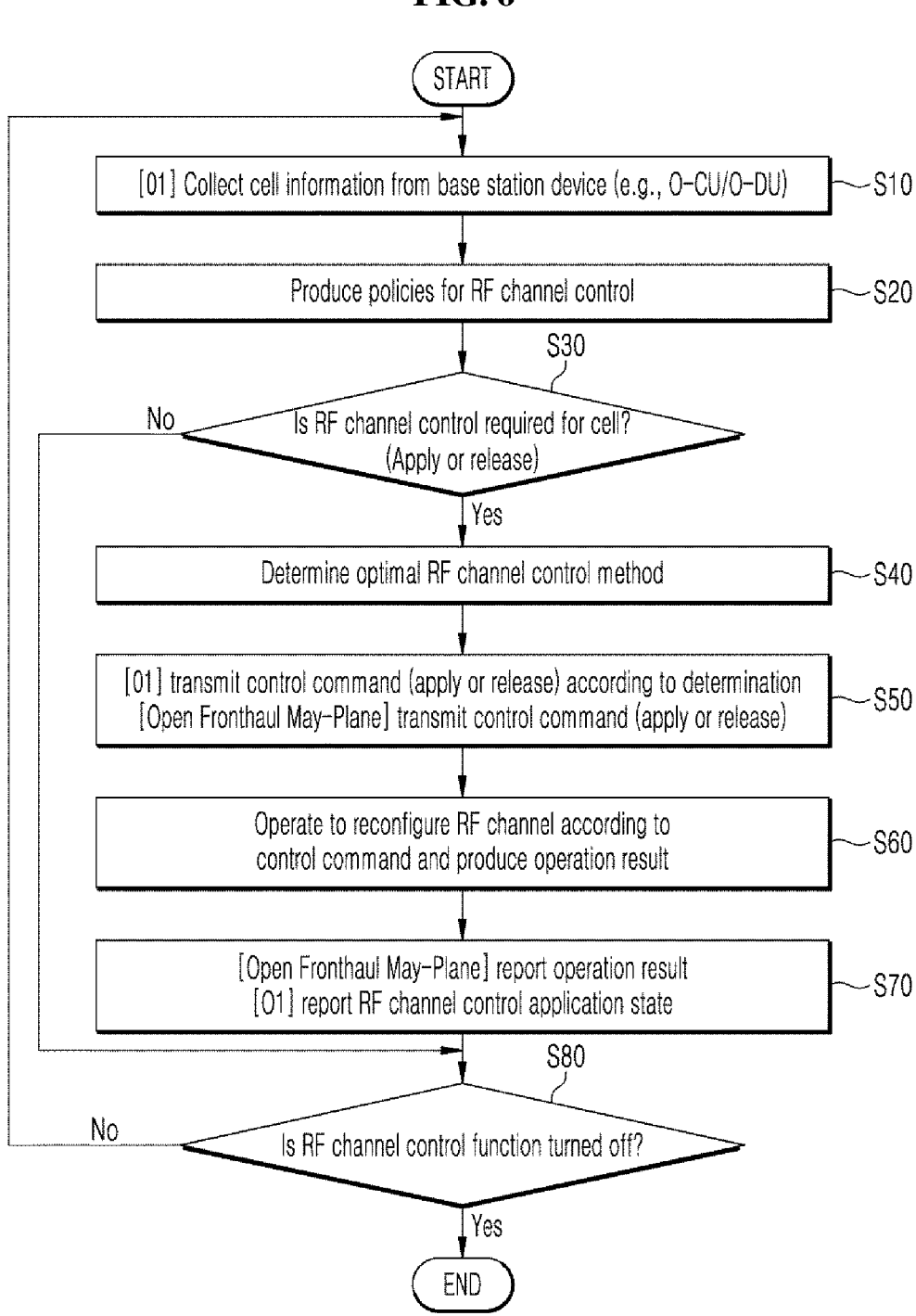
FIGS. 6 and 7 are flowcharts showing an embodiment of a call flow in which an RF channel control method of the present disclosure is performed.
Figure 7:
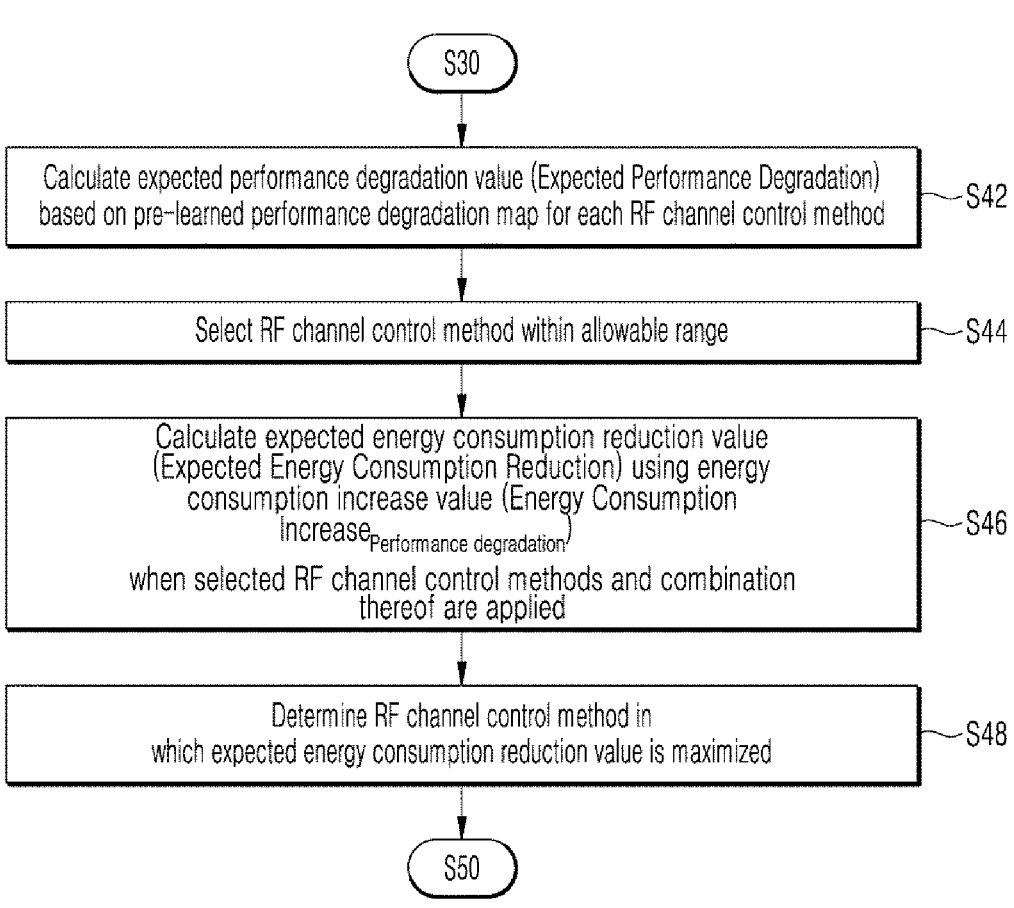

Hereinafter, embodiments of a call flow performed by an RF channel control method of the present disclosure will be described with reference to FIGS. 6 and 7.

In the following description, for the convenience of explanation, a description will be made with reference to FIG. 2 described above.

First, referring to FIG. 6, an RF channel control method of the present disclosure performed in terms of the RF channel control device 100 implemented in the intelligent base station control devices (e.g., SMO, RIC, etc.) will be described.

According to the RF channel control method of the present disclosure, the RF channel control device 100 collects information about a cell (S10).

Specifically, in the present disclosure, each base station device 70 (particularly, the O-CU 56 or the O-DU 53) may transmit information (e.g., uplink/downlink radio resource use rates, throughput, the number of concurrently connected UEs, UE location and distribution, mobility, service type information, and energy consumption and efficiency, state transition, state-specific time information, and the like of the O-RU 60) about the cell of O-RU 60 connected thereto to the RF channel control device 100 periodically or constantly at the time of production.

Thus, the RF channel control device 100 may collect information about the cell from each base station device 70 (the O-CU 56/O-DU 53) under control.

At this time, the information about the cell may be collected from each base station device 70 (the O-CU 56/O-DU 53) through an O1 interface defined between the SMO and the elements of the O-RAN.

Therefore, according to the RF channel control method of the present disclosure, the RF channel control device 100, based on the collected information, may produce or update policies for RF channel control (e.g., application conditions described below, a performance degradation map based on a machine learning model, and the like) (S20).

In addition, according to the RF channel control method of the present disclosure, the RF channel control device 100 may determine whether or not RF channel control is required for each cell of each base station device on the basis of the collected information (S30).

Accordingly, according to the RF channel control method of the present disclosure, if it is determined that RF channel control is required for the cell of the O-RU 60 ("YES" in S30), the RF channel control device 100 determines an optimal RF channel control method to be applied to the cell of the O-RU 60 from among a plurality of RF channel control methods applicable to the cell of the O-RU 60 using at least one of an expected performance degradation value and an expected energy consumption reduction value of each method, which are calculated on the basis of the collected information (S40).

Hereinafter, a configuration for determining an optimal RF channel control method (single or a combination of two or more) will be described in detail with reference to FIG. 7.

According to the RF channel control method of the present disclosure, the RF channel control device 100, based on a performance degradation map obtained by pre-learning performance degradation when each RF channel control method is applied, compared to when the RF channel control method is not applied, for each location in the 3D grid, may calculate an expected performance degradation value for each of a plurality of RF channel control methods using the performance degradation derived for each of concurrently connected UEs at the UE location (S42).

That is, the RF channel control device 100, based on the performance degradation map obtained by pre-learning performance degradation for each location in the 3D grid when each RF channel control method (e.g., the first, second, or third method) is applied, may calculate an expected performance degradation value (Expected Performance Degradation$_{Total\ throughput}$) when applying the RF channel control method to be applied, which is derived for each of the concurrently connected UEs at the UE location, according to the above-described Equation 1 using the performance degradation (Performance Degradation at UE$_1$'s Position) when applying the RF channel control method to be applied.

Alternatively, the RF channel control device 100, based on the performance degradation map obtained by pre-learning performance degradation for each location in the 3D grid when each RF channel control method (e.g., the first, second, or third method) is applied, may calculate an expected performance degradation value (Expected Performance DegradationAverage$_{degradation}$) when applying the RF channel control method to be applied, which is derived for each of the concurrently connected UEs at the UE location, according to Equation 2 using the performance degradation (Performance Degradation at UE$_1$'s Position) when applying the RF channel control method to be applied.

In addition, according to the RF channel control method of the present disclosure, the RF channel control device 100 selects an RF channel control method in which the previously calculated expected performance degradation value falls within a predefined allowable range from among a plurality of RF channel control methods (S44).

That is, assuming that the predefined allowable range is 20% in performance degradation, the RF channel control device 100, based on collected information, may calculate expected performance degradation values when applying a plurality of RF channel control methods (e.g., the first, second, and third methods) according to Equation 1 or 2, and, if the first, second, and third RF channel control methods correspond to 10%, 25%, and 5%, respectively, as a result of the calculation, select the first and third RF channel control methods (S44).

In addition, according to the RF channel control method of the present disclosure, the RF channel control device 100 may determine an optimal RF channel control method (single or a combination of two or more) from among the RF channel control methods selected in step S44 on the basis of the expected energy consumption reduction value calculated according to Equation 3 (S46 and S48).

For example, assuming that the first and third RF channel control methods in which the expected performance degradation value is calculated 20% or less, which falls within the allowable range, are selected as described above, the RF channel control device 100 may calculate an energy consumption increase value (Energy Consumption Increase$_{Performance\ degradation}$) for each of the first RF channel control method, the third RF channel control method, and a combination of the first and third methods according to the above Equation 3 (see Equation 4) and calculate an expected energy consumption reduction values using the same (S46) (see Equation 5).

In addition, the RF channel control device 100, based on the expected energy consumption reduction values calculated for the first RF channel control method, the third RF channel control method, and the combination of the first and third methods, may determine at least one RF channel control method (the first method, the third method, or a combination of the first and third methods) in which the expected energy consumption reduction value is maximized as an optimal RF channel control method (S48).

Describing by referring back to FIG. 6, according to the RF channel control method of the present disclosure, if an optimal RF channel control method (single or a combination of two or more) to be applied to the cell of the O-RU 60 is determined in step S40, the RF channel control device 100 may transmit a control command for applying the determined RF channel control method to the O-RU 60 of the corresponding cell (S50).

For example, the RF channel control device 100 may transmit, through the O1 interface, the control command to the O-DU 53 connected to the O-RU 60 or transmit the control command to the O-CU 56 that controls the O-DU 53 connected to the O-RU 60 such the control command is transmitted to the O-DU 53 by the O-CU 56 (S50).

Accordingly, the base station module 50 (O-CU 56/O-DU 53) receiving the control command through the O1 interface may transmit the control command to the radio device 60 (O-RU 60) of the corresponding cell in a manner of controlling the O-RU 60 according to the received control command (S50).

At this time, control according to the control command may be performed/transmitted through an interface defined in the O-RAN fronthaul, that is, the open fronthaul M-plane.

Therefore, according to the present disclosure, the O-RU 60 may perform an operation to reconfigure the RF channel of the cell according to the control command from the RF channel control device 100 and produce a result of the operation (S60).

The operation result produced described above may be reported from the O-RU 60 to the base station module 50 (O-CU 56/O-DU 53) through the open fronthaul M-plane, and the RF channel control application state reflecting the reported operation result may be reported from the base station module 50 (O-CU 56 O-DU 53) to the RF channel control device 100 through the O1 interface (S70).

As described above, according to the RF channel control method of the present disclosure, the RF channel control device 100, unless the RF channel control function of the present disclosure is turned off ("NO" in S80), may repeat the respective steps described above every time the collected information is updated or in a policy update cycle or separately configured cycle, thereby optimally controlling/reconfiguring the RF channel for a cell requiring RF channel control.

As can be seen from the above description, according to the present disclosure, a specific configuration for dynamically/optimally controlling an RF channel by considering both throughput and energy saving of a cell may be realized in a multi-vendor base station equipment-based O-RAN system, thereby realizing an interface operation between O-RAN equipment related thereto.

Thus, according to the present disclosure, it is possible to have an effect of dynamically/optimally controlling an RF channel of a cell according to the situation by considering that the O-RAN system has a structure in which intelligent base station control devices (e.g., SMO, RIC, etc.) are introduced.

The RF channel control method according to an embodiment of the present disclosure may be implemented in the form of program commands that are executable by various computer means and may be recorded on a computer-readable medium. The computer-readable medium may include program commands, data files, data structures, or a combination thereof. Program commands recorded on the medium may be those specially designed and configured for the present disclosure or those known and usable to those skilled in computer software. Examples of computer-readable recording media include magnetic media such as hard disks, floppy disks, and magnetic tapes, optical media such as CD-ROMs and DVDs, magneto-optical media such as floptical disks, and hardware devices specially configured to store and execute program commands, such as, ROM, RAM, flash memory, and the like. Examples of program commands include high-level language codes executable by a computer using an interpreter and the like, as well as machine language codes such as those produced by a compiler. The hardware devices described above may be configured to operate as one or more software modules to perform the operations of the present disclosure, and vice versa.

Although the present disclosure has been described above in detail with reference to various embodiments, the present disclosure is not limited to the above embodiments, and it may be understood by those skilled in the art to which the present disclosure pertains that the technical spirit of the present disclosure claimed in the following claims encompasses various variations or modifications made without departing from the scope of the present disclosure.

What is claimed is:

1. An RF channel control device comprising:
an information collecting unit configured to collect information for a cell; and
a controller configured to determine an RF channel control method to be applied to the cell using a specific value identified on the basis of the collected information from a plurality of RF channel control methods applicable to the cell,
wherein the specific value comprises at least one of an expected performance degradation value of each method, an expected energy consumption reduction value of each method, and a cell state value, and
wherein the expected performance degradation value and the expected energy consumption reduction value are calculated on the basis of the collected information, and the cell state value is determined on the basis of the collected information.

2. The RF channel control device of claim 1, wherein the collected information for the cell comprises at least one of uplink and downlink radio resource use rates, throughput, the number of concurrently connected UEs, UE location and distribution, mobility, service type information, energy consumption and efficiency, state transition, and state-specific time information of the cell.

3. The RF channel control device of claim 1, wherein the controller is configured to:
calculate an expected performance degradation value and an expected energy consumption reduction value for each of the plurality of RF channel control methods on the basis of the collected information; and
determine at least one RF channel control method on the basis of the expected energy consumption reduction value from RF channel control methods in which the calculated expected performance degradation value falls within a predefined range.

4. The RF channel control device of claim 1, wherein the controller is configured to:
determine at least one RF channel control method that satisfies a first condition about whether it is a preconfigured RF channel control method application time period, a second condition about whether the network load is less than or equal to a preconfigured load threshold, a third condition about whether an expected energy consumption reduction value is greater than or equal to a preconfigured saving threshold, a fourth condition about whether an expected performance degradation value is equal to or less than a preconfigured degradation threshold, or a combination thereof; and
transmit a control command for applying the determined RF channel control method to a radio unit (RU) of the cell such that the RU reconfigures the RF channel according to the control command.

5. The RF channel control device of claim 1, wherein the plurality of RF channel control methods is at least one of a method of turning off or on specific Tx/Rx array of Tx/Rx arrays configured in an RU of the cell, the specific Tx/Rx corresponding to a pattern reflecting the UE location and distribution, a method of reducing or increasing Tx power in the RU of the cell, and a method of reducing or restoring the number of transmissions of a specific signal (always-on signal) transmitted periodically.

6. The RF channel control device of claim 3, wherein the expected performance degradation value for each of the plurality of RF channel control methods is calculated using performance degradation derived for each of concurrently connected UEs at the UE location on the basis of a performance degradation map, wherein the performance degradation map is obtained by pre-learning performance degradation when each RF channel control method is applied, compared to when the RF channel control method is not applied, for each location in the 3D grid.

7. The RF channel control device of claim 3, wherein the controller determines at least one RF channel control method from the RF channel control methods in which an expected energy consumption reduction value is maximized, and wherein the expected energy consumption reduction value calculated for the at least one RF channel control method is calculated using an energy consumption reduction value when the at least one RF channel control method is applied and an energy consumption increase value increased due to the application of the at least one RF channel control method.

8. The RF channel control device of claim 7, wherein the energy consumption increase value is calculated by applying the expected performance degradation value calculated for the at least one RF channel control method to a value obtained by subtracting the energy consumption reduction value when the at least one RF channel control method is applied from the energy consumption when the RF channel control method is not applied.

9. A distributed unit (DU) comprising a function of transmitting a control command based on collected information for a cell controlled by the DU to a radio unit (RU) of the cell such that the RU reconfigures an RF channel of the cell according to the control command, wherein the control command is a command for applying an RF channel control method determined using a specific value identified on the basis of the collected information from a plurality of RF channel control methods applicable to the cell, wherein the specific value comprises at least one of an expected performance degradation value of each method, an expected energy consumption reduction value of each method, and a cell state value, wherein the expected performance degradation value and the expected energy consumption reduction value are calculated on the basis of the collected information, and the cell state value is determined on the basis of the collected information.

10. A radio unit (RU) for forming a cell, the RU comprising a function of reconfiguring when a control command transmitted on the basis of collected information for the cell is received, an RF channel of the cell according to the control command, wherein the control command is a command for applying an RF channel control method determined using a specific value identified on the basis of the collected information from a plurality of RF channel control methods applicable to the cell, wherein the specific value comprises at least one of an expected performance degradation value of each method, an expected energy consumption reduction value of each method, and a cell state value, wherein the expected performance degradation value and the expected energy consumption reduction value are calculated on the basis of the collected information, and the cell state value is determined on the basis of the collected information.

11. An RF channel control method of an RF channel control device, the RF channel control method comprising:

collecting information for a cell; and determining an RF channel control method to be applied to the cell using a specific value identified on the basis of the collected information from among a plurality of RF channel control methods applicable to the cell, wherein the specific value comprises at least one of an expected performance degradation value of each method, an expected energy consumption reduction value of each method, and a cell state value, wherein the expected performance degradation value and the expected energy consumption reduction value is calculated on the basis of the collected information and the cell state value is determined on the basis of the collected information.

12. The RF channel control method of claim 11, wherein the determining of an RF channel control method comprises:

calculating an expected performance degradation value and an expected energy consumption reduction value for each of the plurality of RF channel control methods on the basis of the collected information; and determining at least one RF channel control method on the basis of the expected energy consumption reduction value from RF channel control methods in which the calculated expected performance degradation value falls within a predefined range.

13. The RF channel control method of claim 11, wherein the determining of an RF channel control method comprises:

determining at least one RF channel control method that satisfies a first condition about whether it is a preconfigured RF channel control method application time period, a second condition about whether the network load is less than or equal to a preconfigured load threshold, a third condition about whether an expected energy consumption reduction value is greater than or equal to a preconfigured saving threshold, a fourth condition about whether an expected performance degradation value is equal to or less than a preconfigured degradation threshold, or a combination thereof; and transmitting a control command for applying the determined RF channel control method to a radio unit (RU) of the cell such that the RU reconfigures the RF channel according to the control command.

14. The RF channel control method of claim 12, wherein the expected performance degradation value for each of the plurality of RF channel control methods is calculated using performance degradation derived for each of concurrently connected UEs at the UE location on the basis of a performance degradation map, wherein the performance degradation map is obtained by pre-learning performance degradation when each RF channel control method is applied, compared to when the RF channel control method is not applied, for each location in the 3D grid.

15. The RF channel control method of claim 12, wherein the determining of an RF channel control method comprises determining at least one RF channel control method in which an expected energy consumption reduction value is maximized from the RF channel control methods, and wherein the expected energy consumption reduction value calculated for the at least one RF channel control method is calculated using an energy consumption reduction value when the at least one RF channel control method is applied and an energy consumption increase value increased due to the application of the at least one RF channel control method.

16. The RF channel control method of claim 15, wherein the energy consumption increase value is calculated by applying the expected performance degradation value calculated for the at least one RF channel control method to a value obtained by subtracting the energy consumption reduction value when the at least one RF channel control method is applied from the energy consumption when the RF channel control method is not applied.

* * * * *